April 20, 1926.  
E. L. DAHLQUIST  
BUSHING REMOVER  
Filed May 8, 1924  
1,581,483
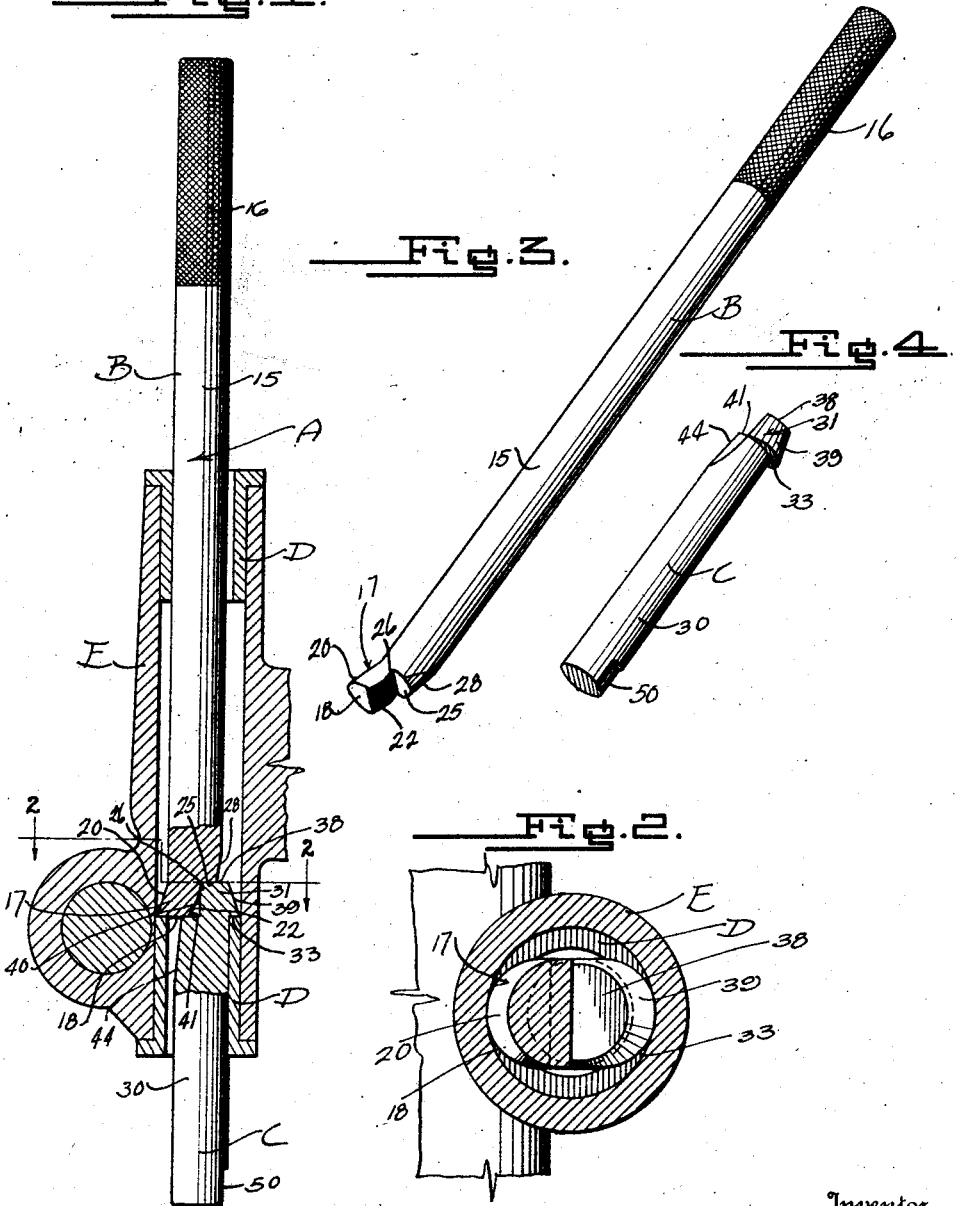

Patented Apr. 20, 1926.

1,581,483

UNITED STATES PATENT OFFICE.

ERNEST L. DAHLQUIST, OF AUBURN, IOWA.

BUSHING REMOVER.

Application filed May 8, 1924. Serial No. 711,896.

*To all whom it may concern:*

Be it known that I, ERNEST L. DAHLQUIST, a citizen of the United States, residing at Auburn, in the county of Sac and State of Iowa, have invented certain new and useful Improvements in a Bushing Remover, of which the following is a specification.

This invention relates to improvements in bushing removing tools.

The primary object of the invention is the provision of a bushing remover particularly well adapted to be used in connection with the removal of bushings from automobile spindles and the like, so that the entire driving force may be used to effect the removal of the bushing.

There are several different types of tools used for bushing removing, but many of them are ineffective. Several types in particular use part of the driving force to effect a wedging action of the parts of the tool within the bushing, with the result that the bushing is sometimes wedged in the spindle, requiring exceptional force to remove the bushing, which may mutilate the spindle, bushing, and tool.

A further object of this invention is the provision of a bushing removing tool embodying a pair of complementary parts provided with shoulders thereon adapted for bushing engagement, and with means by which one of the tool parts may engage the other so that the entire driving force applied upon one of the parts may be utilized to effect the bushing removal.

Other objects and advantages of this invention will be apparent during the course of the following detailed description.

In the accompanying drawings, wherein similar reference characters designate corresponding parts throughout the several views, Figure 1 is a view partly in cross section showing the improved bushing remover in use.

Figure 2 is a cross sectional view taken on the line 2—2 of Figure 1.

Figures 3 and 4 are perspective views of the details of the bushing removing tool.

In the accompanying drawings, wherein for the purpose of illustration is shown only the preferred embodiment of this invention, the letter A may generally designate the improved tool, which may consist of a driving part B; and a driven part C; the parts being utilized in connection with the driving of a bushing D from the spindle E or like piece of machinery.

Referring to the upper or driving part B of the tool, the same includes a shank portion 15, which is straight, and of any desired length, preferably having the upper outer circumference 16 thereof knurled. The driving part B at the lower end thereof, is provided with a reduced offset portion 17 offset slightly outwardly from the outer circumference of the shank 15, and providing a bottom surface 18 which is disposed in a plane at right angles to the axis of the shank 15, and the side arcuate surface 20 of the reduced portion 17 is disposed in a sloping relation with respect to the circumference of the shank 15. The rear surface 22 of the reduced portion 17 is flat and disposed at an obtuse angle with respect to the surface 18, and preferably in sloping relation with respect to the axis of the shank 15. Adjacent the juncture of the reduced portion 17 with the shank 15, a horizontal surface 25 is provided, which is at right angles to the axis of the shank 15, and which surface 25 is, in fact, the lower surface of the shank 15. The reduced portion 17, adjacent the horizontal surface 25 is provided with a vertically disposed surface 26 which leads from the tapered or sloping surface 22 in right angled relation with the surface 25 above mentioned, and which surfaces 25 and 26 provide a sort of recess adapted to receive the upper part of the driven portion C, as will be subsequently described. The side of the shank 15, just above the horizontal surface 25, is disposed in a sloping relation towards the circumference of the shank 15, as illustrated by numeral 28 in the drawing, this taper 28 being effected by removal of a portion of the stock of the shank 15, to facilitate ready insertion of a tool within the bore of a bushing or spindle, as will be subsequently mentioned.

Referring in detail to the construction of the driven part C, the same includes a shank portion 30, preferably straight, which is much shorter than the shank portion 15, and adapted to be inserted in the opposite end of the spindle from that which the driving part B is inserted. This tool portion C at the upper end of the shank 30 is provided with a reduced head 31, so to speak, and which is offset to one side of the shank 30, to provide a substantially segmental shaped shoulder 33, in right angled relation with respect to the axis of shank 30, which faces toward the lower end of the driven part C. The head 31 from the shoulder 33 to the top surface 38 thereof tapers, as at 39, and the top surface 38 is disposed in parallel relation with respect to the shoulder 33, and of course, in a plane at right angles to the axis of the shank 30. The head 31 is provided with a flat vertical surface 40 opposite to the tapered arcuate surface 39, and the top surface 41 of the shank 30 is disposed in right angled relation with respect to the axis of the shank 30, and in right angled relation with respect to the surface 40 above mentioned; the surfaces 40 and 41 providing a sort of recess within which the lower portion of the offset 17 may engage, as will be subsequently described. The stock of the shank 30 on that side opposite the shoulder 33 is removed, to provide a tapered surface 44 which will facilitate the insertion of the driven portion 30 into the spindle upon the bushing.

Referring to the use of the improved bushing remover, the driven part B may be used alone when the bushings are not worn too badly or are not fitting too tight within the bore of the spindle. Thus, the tool shank 15 is inserted into the bore of the bushing, until the surface 18 of the tool rests upon the inside edge of the bushing, and merely by hammering upon the exposed end of the tool part B, the bushing may be forced out of the spindle. It is to be noted that the insertion of the tool part B is facilitated, notwithstanding the offset provided by the portion 17, incident to the fact that the stock of the shank 15 is removed at 28, so that the tool B may be tipped slightly during its insertion through the bore of the bushing and spindle. Incident to the offset of the portion 17, the surface 18 provides a segmental shaped shoulder which rests upon the top edge of the bushing D, as is illustrated in Figure 2 of the drawings, so that enough surface contact will be had with the bushing to facilitate its removal incident to a driving operation.

For the main part the driving and driven portions B and C will be used in combination, and in this event the bushing or driven portion C is first inserted into the bore of the spindle E, through the bore of the bushing D, and it is to be noted that the lower end of the portion C is cut away, as at 50, so that the operator may determine the exact location of the offset shoulder 33. After the tool portion B has been inserted into the bushing bore to the desired extent, it may be moved laterally and by pulling outwardly again the segmental shaped shoulder 33 may rest upon the inside edge of the bushing D in a snug bearing relation thereon. It is to be particularly noted in this respect that the shoulder 33 lies in the same plane with the surface 41. The driven part B of the tool is next inserted from the upper end of the spindle, and this insertion is facilitated incident to the hereinbefore mentioned structure of the tool. The taper 22 at the rear of the offset 17 permits the sliding of the offset portion 17 into position over the side edge formed by the juncture of the surface 38 and the flat surface 40 of the head portion 31, so that the surface 18 of the tool part B may be placed in abutting relation against the top edge of the bushing D, and so that a portion of said surface 18 may also contact upon the surface 41 of the tool part B. In this position it is to be noted that the squared corner of the head 31 rests within the recess of the tool part B provided by the juncture of the surfaces 25 and 26. The tool portions B and C will then each have a segmental shaped shoulder portion engaging at diametrically opposed points upon the inner edge of the bushing D, and as is illustrated in Figure 2 of the drawings, and the driving operation may be commenced. Incident to driving force applied upon the upper end of the tool portion B the bushing D may be forced from the spindle E, it is to be particularly noted that the entire driving force is utilized for this removal, as there is no wedging action whatsoever of the tool parts within the bushing or the spindle, as is the case in connection with most types of bushing removers. The parts of the tool can be economically made, either drop forged or machine made, using a good grade of tool steel.

It is well known to those skilled in the art to which this invention relates that certain types of bushings are very difficult to remove, such as for instance the type of bushing where only a very small space occurs between the inside edge of the bushing and an annular shoulder which may be provided in the spindle. This type of bushing remover is particularly well adapted for use in connection with removal of such bushings, as it is to be noted that the portions of the tool parts B and C adjacent the shoulders 18 and 33 are acutely formed, and may wedge themselves into place behind the shoulder. This is important also for the purpose of removing dirt or other foreign matter which may have accumulated upon the inside edge of the bushing, above the same. Incident to the complementary nature of the tool parts B and C, their correct positioning in the spindle for bushing removing purposes is at all times assured.

Various changes in the shape, size, and arrangement of parts may be made to the form of invention herein shown and described, without departing from the spirit of this invention or the scope of the claims.

I claim:

1. As an article of manufacture a bushing removing tool including a straight shank portion and a reduced laterally offset portion at the end thereof providing a shoulder disposed in a plane at right angles to the axis of the shank, the outer surface of the reduced portion tapering in acute angled relation with respect to said shoulder to a juncture point with the circumference of the shank.

2. As an article of manufacture a bushing removing tool consisting of a straight shank portion and a reduced portion providing a lower surface in right angled relation with respect to the axis of the shank portion, said reduced portion forwardly thereof providing a tapered surface offset from the circumference of the shank, and a rear tapering surface in obtuse angular relation with respect to the plane in which the shoulder of the reduced portion is positioned.

3. As an article of manufacture a bushing remover consisting of a shank portion having the lower part thereof at one side partially removed, and outwardly of said part providing a reduced portion integral therewith and offset slightly laterally of the shank portion and which reduced portion provides a lower surface disposed in a plane at right angles to the axis of the shank.

4. In a bushing remover a driver portion having a bushing engaging shoulder and a second shoulder thereon, and a driven portion detachable with respect to the first mentioned portion having a bushing engaging shoulder and a second shoulder thereon, said driver portion at its end edge adapted to engage in driving relation against the second shoulder of the driven portion and upwardly thereof having its second shoulder engaging in driving relation against the end edge of the driven portion whereby the driving force applied axially of the driving portion will wholly be transmitted axially of the driven portion.

5. A bushing removing tool consisting of a pair of complementary parts each having a shank with a laterally offset shoulder beyond the circumference thereof, and including other shoulders and surfaces adapted when the parts are in assembled relation to provide stabilizing surface contact of the parts by relative engagement of said shoulders and surfaces last mentioned in a plurality of differently spaced planes arranged transversely of the axis of said tool.

6. As an article of manufacture a bushing remover consisting of a driving portion providing a reduced laterally offset end providing a bushing engaging shoulder disposed in a plane at right angles to the axis of the shank of said portion, said driving portion providing a substantially right angularly shaped recess adjacent the juncture of the reduced portion with the shank, said shank adjacent said recess being tapered, and a driven portion having a head thereon provided with a reduced head providing a bushing engaging shoulder, said driven portion including a shank having a surface adapted to receive in contacting relation thereagainst the lower surface of the reduced portion of said driving portion so that the upper end of the head of said driven portion rests within the right angularly disposed recess of said driving portion, and whereby the bushing engaging shoulders of the driving and driven portions are positioned at diametrically opposed points.

7. In combination a pair of bushing removing tool parts each having laterally offset bushing engaging shoulders thereon with the sides of said parts opposite said shoulders partially removed in a tapering relation to facilitate insertion of said parts within a bore.

8. In combination a pair of bushing removing tool parts each having laterally offset bushing engaging shoulders thereon with the sides of said parts opposite said shoulders partially removed in a tapering relation to facilitate insertion of said parts within a bore, said parts being formed to provide a plurality of surfaces engaging each other at a plurality of planes in right angled relation with respect to the axis of said tool when the parts are assembled.

9. In a bushing remover the combination of driving and driven portions each having shanks with reduced ends and laterally offset bushing engaging shoulders, each of said portions adjacent the juncture of its reduced end and shank providing a shoulder transversely arranged with respect to the axis of said portions, and against which the end edges of the reduced ends engage to stably support the driving and driven portions in alignment with the bushing engaging shoulders in the same plane.

10. As an article of manufacture a bushing remover tool part including a substantially cylindrical shaped shank having a reduced end portion which extends laterally beyond the circumference of the shank portion to provide at its end edge a segmental shoulder offset from the circumference of the shank, said reduced portion from the edge of said shoulder towards said shank tapering into merging relation with the circumference of said shank, said reduced portion and shank at the juncture thereof providing a right angled shoulder disposed in a plane spaced from the plane of said segmental shoulder, said reduced portion tapering at its inner side from the end edge of said reduced portion toward said right angled shoulder, said shank from said right angled shoulder being cut away at a slight taper.

11. As an article of manufacture a tool part for a bushing remover consisting of a substantially cylindrical shaped shank having a reduced part thereon, said tool part at the juncture of the reduced part and shank providing a transverse shoulder, and said reduced part laterally thereof providing a segmental shoulder offset with respect to the circumference of said shank, said offset shoulder and first mentioned shoulder being disposed in substantially the same transverse plane, and said reduced part at its outer side tapering from the edge of said offset shoulder toward the end edge of said reduced part.

12. In a bushing remover the combination of driving and driven portions each including shanks and reduced ends, each of said driving and driven portions at the juncture of its shank and reduced end providing a transverse shoulder extending inwardly from the circumference of the shank, said driving portion at the end edge of the reduced end providing a laterally extending bushing engaging shoulder which extends laterally of the circumference of its respective shank, said driven portion providing a bushing engaging shoulder laterally extending from the circumference of its respective shank, which shoulder is disposed in the same plane as the first mentioned shoulder which inwardly extends from the circumference of the shank of said driven portion, said driving and driven portions when placed in alignment having the end edges of their reduced portions abutting in engagement with the inwardly extending shoulders of said portions so that the bushing engaging shoulders are disposed in the same plane with each other and with the inwardly extending shoulder of said driven portion.

ERNEST L. DAHLQUIST.